US010541410B2

(12) United States Patent
Li et al.

(10) Patent No.: US 10,541,410 B2
(45) Date of Patent: Jan. 21, 2020

(54) POSITIVE ELECTRODE AND LI-ION BATTERY INCLUDING THE SAME

(71) Applicant: CONTEMPORARY AMPEREX TECHNOLOGY CO., LIMITED, Ningde (CN)

(72) Inventors: Zhenhua Li, Ningde (CN); Zhenxing Pei, Ningde (CN); Wuyuan Zou, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 306 days.

(21) Appl. No.: 15/273,474

(22) Filed: Sep. 22, 2016

(65) Prior Publication Data
US 2017/0092943 A1    Mar. 30, 2017

(30) Foreign Application Priority Data

Sep. 24, 2015  (CN) .......................... 2015 1 0615797

(51) Int. Cl.
H01M 4/131    (2010.01)
H01M 4/36     (2006.01)
H01M 4/136    (2010.01)
H01M 4/505    (2010.01)
H01M 4/525    (2010.01)
H01M 4/58     (2010.01)
H01M 10/0525  (2010.01)
H01M 10/42    (2006.01)
H01M 4/02     (2006.01)

(52) U.S. Cl.
CPC ........... *H01M 4/366* (2013.01); *H01M 4/131* (2013.01); *H01M 4/136* (2013.01); *H01M 4/505* (2013.01); *H01M 4/525* (2013.01); *H01M 4/5825* (2013.01); *H01M 10/0525* (2013.01); *H01M 10/4235* (2013.01); *H01M 2004/021* (2013.01); *H01M 2004/028* (2013.01); *H01M 2200/00* (2013.01); *H01M 2220/20* (2013.01)

(58) Field of Classification Search
None
See application file for complete search history.

(56) References Cited

U.S. PATENT DOCUMENTS

| 6,881,520 B1 | 4/2005 | Li |
| 2004/0121234 A1 | 6/2004 | Le |
| 2007/0026312 A1 | 2/2007 | Imachi et al. |
| 2011/0123866 A1 | 5/2011 | Pan et al. |
| 2011/0281159 A1 | 11/2011 | Farmer et al. |
| 2012/0021284 A1 | 1/2012 | Lee et al. |
| 2012/0164512 A1 | 6/2012 | Wu et al. |
| 2012/0244430 A1 | 9/2012 | Yamazaki et al. |
| 2013/0089781 A1 | 4/2013 | Miyazaki et al. |
| 2014/0162118 A1 | 6/2014 | Chu et al. |
| 2014/0162146 A1* | 6/2014 | Ryu ............... H01M 4/8673 429/405 |
| 2015/0228975 A1 | 8/2015 | Lee et al. |
| 2016/0301063 A1 | 10/2016 | Yukinobu et al. |
| 2016/0308202 A1 | 10/2016 | Kuriyama et al. |

FOREIGN PATENT DOCUMENTS

| CN | 1725548 A | 1/2006 |
| CN | 202268433 U | 6/2012 |
| CN | 103401016 A | 11/2013 |
| CN | 103633289 A | 3/2014 |
| CN | 102368547 | 5/2016 |
| EP | 2410600 A2 | 1/2012 |
| JP | H04218261 A | 8/1992 |
| JP | 2000515300 A | 11/2000 |
| JP | 2006512742 A | 4/2006 |
| JP | 2007-026676 | 2/2007 |
| JP | 2007035589 A | 2/2007 |
| JP | 2009054469 A | 3/2009 |
| JP | 2009099523 A | 5/2009 |
| JP | 2012028322 A | 2/2012 |
| JP | 2012134149 A | 7/2012 |
| JP | 2012216515 A | 11/2012 |
| JP | 2013504168 A | 2/2013 |
| JP | 2013211209 A | 10/2013 |

(Continued)

OTHER PUBLICATIONS

First Office Action for Japanese Application No. 2016-180474 dated Aug. 22, 2017, with machine English translation provided by foreign associate.
Second Office Action for Chinese application No. 201510615797.0 dated Jul. 14, 2017, with machine English translation provided by foreign associate.
From EP 16190217, European Search Report with search opinion, dated Feb. 14, 2017.
From CN 201510615797.0, First Office Action and search report, dated Dec. 19, 2016, and its English translation from SIPO.

(Continued)

Primary Examiner — Tracy M Dove
(74) Attorney, Agent, or Firm — Ladas & Parry, LLP

(57) ABSTRACT

The present application relates to a positive electrode and a Li-ion battery including the positive electrode, the positive electrode comprises a positive electrode current collector and a first active material layer including a first positive electrode active material arranged on the positive electrode current collector, a buffer layer including a carbon material and a binder, and a second active material layer including a second positive electrode active material, the buffer layer is arranged between the first active material layer and the second active material layer. The positive electrode provided by the present application, when applied to the lithium battery, not only can improve the safety performance of the Li-ion battery, but also improve the cycle performance of the Li-ion battery.

9 Claims, No Drawings

(56) References Cited

FOREIGN PATENT DOCUMENTS

| JP | 2015056318 A | 3/2015 |
|----|--------------|--------|
| JP | 2015130254 A | 7/2015 |
| JP | 2015144108 A | 8/2015 |
| WO | 2010032159 A | 3/2010 |
| WO | 2012005301 A | 9/2013 |
| WO | 2014/149766 A1 | 9/2014 |
| WO | 2015072359 A1 | 3/2017 |

OTHER PUBLICATIONS

Deng, Z. Q., & Manthiram, A., "Influence of Cationic Substitutions on the Oxygen Loss and Reversible Capacity of Li-rich layered Oxide Cathodes," The Journal of Physical Chemistry, Mar. 17, 2011, 115: pp. 7097-7103.

From JP Application No. 2016-180474, second Office Action dated Apr. 24, 2018 with English translation from Global Dossier.

From CN Application No. 201510615797.0, third Office Action and search report, dated Dec. 18, 2017, and its machine English translation from Google.

* cited by examiner

POSITIVE ELECTRODE AND LI-ION BATTERY INCLUDING THE SAME

CROSS-REFERENCE TO RELATED APPLICATIONS

The present application claims priority to Chinese patent application No. 2015106157970, filed on Sep. 24, 2015, the content of which is incorporated herein by reference in its entirety.

TECHNICAL FIELD

The present application relates to the field of Li-ion battery and, particularly relates to a positive electrode and a Li-ion battery including the positive electrode.

BACKGROUND

In order to improve the safety performance of the battery, in most of the prior arts, a manner of mixing materials with high safety in the slurry is adopted, which in most cases needs a high proportion of the materials with high safety so as to obtain the effect of significantly improving the safety of the battery. However, in the meantime of improving the safety, this manner selected will usually greatly reduce the energy density of the battery and increase the internal resistance of the battery when applied in low state of charge (State Of Charge, SOC). Besides, it is still difficult for this manner to prominently improve the safety of the battery with large capacity used in electric vehicles.

Additionally, in some other prior arts, in order to improve the safety of the battery, a manner of coating an active material layer on the positive electrode current collector and then coating another active material layer is adopted, however, this manner will lead to increasing of polarization of the battery and degeneration or even rapid slump of cycle performance.

However, the above-mentioned manners of improving the safety of the battery will deteriorate the performance and reliability of the battery, such as reducing energy density of the battery, increasing internal resistance of the battery and resulting in cycle slump and so on.

SUMMARY

In order to solve the above-mentioned problems, the applicant has made innovative research, and results show that: arranging on the positive electrode current collector: a first positive electrode active material layer containing a first positive electrode active material, a buffer layer containing a carbon material and a binder and a second positive electrode active material layer containing a second positive electrode active material, with the buffer layer between the first positive electrode active material layer and the second positive electrode active material layer, can not only improve safety performance of a lithium battery, but also improve cycle performance of the Li-ion battery, thus the present application is completed.

The present application aims to provide a positive electrode, which includes a positive electrode current collector and a first positive electrode active material layer containing a first positive electrode active material on the positive electrode current collector, a buffer layer containing a carbon material and a binder and a second positive electrode active material layer containing a second positive electrode active material, in which, the buffer layer is arranged between the first positive electrode active material layer and the second positive electrode active material layer.

Another objective of the present application is to provide a Li-ion battery, which includes the positive electrode provided by the present application.

The application of the positive electrode provided by the present application to lithium batteries, especially to Li-ion batteries improves safety performance of the Li-ion batteries, for example in abuse conditions less prone to catch fire and explode, furthermore, reducing polarization increase and internal resistance increase in discharge, meanwhile increasing the electrolyte diffusion on the positive electrode interface, as well as that the existence of the buffer layer greatly reduces the interface damage of the battery due to the expansion difference of the active material layers in the cycle process of the battery, and greatly improves the cycle performance of the Li-ion battery.

DESCRIPTION OF EMBODIMENTS

The characteristics and advantages of the present application will become more clear and definite through the following detailed description of the present application.

An objective of the present application is to provide a positive electrode, which includes a positive electrode current collector and a first active material layer containing a first positive electrode active material arranged on the positive electrode current collector, a buffer layer containing a carbon material and a binder, and a second active material layer containing a second positive electrode active material, the buffer layer is arranged between the first active material layer and the second active material layer.

It should be noted that, in the above-mentioned positive electrode, on the positive electrode current collector, the first active material layer, the buffer layer and the second active material layer are successively arranged from bottom to top; or, on the positive electrode current collector, the second active material layer, the buffer layer and the first active material layer are successively arranged from bottom to top. That is to say, the second active material layer containing the second positive electrode active material can also be used as the first active material layer, and the first active material layer containing the first positive electrode active material can also be used as the second active material layer.

In the above-mentioned positive electrode, the first positive electrode active material is not particularly restricted, which can be selected according to actual demand. Preferably, the first positive electrode active material is one or more selected from a group consisting of lithium phosphate salt, lithium silicate salt, lithium spinel salt and a positive electrode material formed after the above-mentioned lithium phosphate salt, lithium silicate salt or lithium spinel salt being doped and/or coated.

The material formed after the above-mentioned lithium phosphate salt, lithium silicate salt or lithium spinel salt being doped and/or coated refers to a material formed after the above-mentioned lithium phosphate salt, lithium silicate salt or lithium spinel salt being doped, or a material formed after the above-mentioned lithium phosphate salt, lithium silicate salt or lithium spinel salt being coated, or a material formed after the above-mentioned lithium phosphate salt, lithium silicate salt or lithium spinel salt being doped and then being coated. Methods of doping and coating are not particularly restricted, and conventional methods can be selected. For example, the method of doping can specifically refer to Chinese patent No. CN201110269159, "Li-ion Battery and Positive Electrode Active Material thereof"; the method of coating can specifically refer to the document "Influence of Cationic Substitutions on the Oxygen Loss and Reversible Capacity of Li-rich layered Oxide Cathodes" (The Journal of Physical Chemistry. 2011, 115: 7097-7103). Additionally, in the process of the above-mentioned doping or coating, there is no special requirement on the element doped and the material coated, which can be selected according to actual demand.

Preferably, the first positive electrode active material is one or more selected from a group consisting of the following materials: $LiM'_xM_{1-x}PO_4$, $Li_2M'_xQ_{1-x}SiO_4$ and $LiM'_{x'}M_{2-x'}O_4$; in which, $0 \leq x \leq 0.25$, $0 \leq x'' \leq 0.25$, $0 \leq x''' \leq 0.25$, M is at least one selected from a group consisting of Mn, Fe, Co and Ni, Q is at least one selected from a group consisting of Mn, Fe, Co and Ni, M' is one or more selected from a group consisting of Al, Cr, Mg, Zr, Mo, V, Ti, B, F and Y.

Preferably, inorganic compound A is selected to coat the above-mentioned lithium phosphate salt, lithium silicate salt, lithium spinel salt and the doped material formed after the above-mentioned lithium phosphate salt, lithium silicate salt or lithium spinel salt being doped; in which, the inorganic compound A can be one or more selected from a group consisting of $Al_2O_3$, $AlF_3$, $AlPO_4$, $Li_3PO_4$, $Li_4P_2O_7$, $ZrO_2$, MgO, $TiO_2$, $Y_2O_3$, $LiAlO_2$ and $LiNiPO_4$. That is to say, in the coated materials formed after the above-mentioned materials being coated, the coating layer is one or more selected from a group consisting of $Al_2O_3$, $AlF_3$, $AlPO_4$, $Li_3PO_4$, $Li_4P_2O_7$, $ZrO_2$, MgO, $TiO_2$, $Y_2O_3$, $LiAlO_2$ and $LiNiPO_4$. A carbon material can also be selected to coat the above-mentioned lithium phosphate salt, lithium silicate salt, lithium spinel salt and the doped material formed after the above-mentioned lithium phosphate salt, lithium silicate salt or lithium spinel salt being doped. The specific type of the carbon material can be selected according to actual demand, for example, carbon black (e.g. carbon black Super P), carbon fiber (VGCF), carbon nanotubes (CNTs), graphene, mesoporous ordered carbon (e.g. mesoporous ordered carbon CMK-3), active carbon and so on can all be used to coat the above-mentioned lithium phosphate salt, lithium silicate salt, lithium spinel salt and the doped material formed after the above-mentioned lithium phosphate salt, lithium silicate salt or lithium spinel salt being doped. The carbon material can also be formed from sintering of an organic material such as asphalt, sucrose.

In a preferred embodiment, the content of the inorganic compound A or the carbon material is 0.005~5% of the total weight of the positive electrode active material before being coated, further preferably, the content of the inorganic compound A or the carbon material is 0.05~4% of the total weight of the positive electrode active material before being coated, furthermore preferably, the content of the inorganic compound A or the carbon material is 0.05~3% of the total weight of the positive electrode active material before being coated, and most preferably is 0.05~2%.

Examples of the first positive electrode active material include: $LiFePO_4$, $LiNi_{0.5}Mn_{1.5}O_4$, $LiMn_{0.75}Fe_{0.25}PO_4$, $Li_2CoSiO_4$, a material formed from $LiNi_{0.5}Mn_{1.5}O_4$ coated by $Al_2O_3$ with 0.1% content of the weight of $LiNi_{0.5}Mn_{1.5}O_4$ before being coated and $TiO_2$ with 0.1% content of the weight of $LiNi_{0.5}Mn_{1.5}O_4$ before being coated.

Preferably, in the above-mentioned positive electrode, the thickness of the first active material layer is 0.1~200 μm, further preferably, the thickness of the first active material layer is 0.5~100 μm, furthermore preferably, the thickness of the first active material layer is 5~50 μm.

In the above-mentioned positive electrode, the second positive electrode active material is not particularly restricted, which can be selected according to actual demand. Preferably, the second positive electrode active material is one or more selected from a group consisting of lithium cobalt dioxide ($LiCoO_2$), lithium nickelate ($LiNiO_2$), a ternary lithium compound containing Ni, Co and Mn, a ternary lithium compound containing Ni, Co and Al, and a positive electrode material formed after the above-mentioned lithium cobalt dioxide, lithium nickelate, the ternary lithium compound containing Ni, Co and Mn or the ternary lithium compound containing Ni, Co and Al being doped and/or coated.

The material formed after the above-mentioned lithium cobalt dioxide, lithium nickelate, the ternary lithium compound containing Ni, Co and Mn or the ternary lithium compound containing Ni, Co and Al being doped and/or coated refers to a material formed after the above-mentioned lithium cobalt dioxide, lithium nickelate, the ternary lithium compound containing Ni, Co and Mn or the ternary lithium compound containing Ni, Co and Al being doped, or a material formed after the above-mentioned lithium cobalt dioxide, lithium nickelate, the ternary lithium compound containing Ni, Co and Mn or the ternary lithium compound containing Ni, Co and Al being coated, or a material formed after the above-mentioned lithium cobalt dioxide, lithium nickelate, the ternary lithium compound containing Ni, Co and Mn or the ternary lithium compound containing Ni, Co and Al being doped and then being coated. Methods of doping and coating are not particularly restricted, and conventional methods can be selected. For example, the method of doping can specifically refer to Chinese patent No. CN201110269159, "Li-ion Battery and Positive Electrode Active Material thereof"; the method of coating can specifically refer to the document "Influence of Cationic Substitutions on the Oxygen Loss and Reversible Capacity of Li-rich layered Oxide Cathodes" (The Journal of Physical Chemistry. 2011, 115: 7097-7103). Besides, in the process of the above-mentioned doping or coating, there is no special requirement on the element doped and the material coated, which can be selected according to actual demand.

Preferably, the second positive electrode active material is one or more selected from a group consisting of the following materials: $Li_aQ'_zCo_{1-z}O_2$, $Li_aQ'_{1-z}O_2$, $Li_aQ'_{z'}Ni_{y}Mn_{y'}Co_{1-y-y'-z'}O_2$ and $Li_aQ''_{z''}Ni_{y''}Al_{y'''}Co_{1-y''-y'''-z''}O_2$, in which, $0 \leq z \leq 0.25$, $0 \leq z' \leq 0.25$, $0 \leq z'' \leq 0.25$, $0 \leq z''' \leq 0.25$, $0 < y < 1$, $0 < y' < 1$, $0 < y'' < 1$, $0 < y''' < 1$, $0 < y+y'+z' < 1$, $0 < y''+y'''+z'' < 1$, $1 \leq a \leq 1.2$. Preferably, the element Q' is one or more selected from a group consisting of Ni, Co, Mn, Al, Cr, Mg, Zr, Mo, V, Ti, B, F and Y. Q" is one or more selected from a group consisting of Cr, Mg, Zr, Mo, V, Ti, B, F and Y.

Preferably, a carbon material or inorganic compound B is selected to coat the above-mentioned lithium cobalt dioxide, lithium nickelate, ternary lithium compounds and the doped material formed after the above-mentioned lithium cobalt dioxide, lithium nickelate or ternary lithium compounds being doped, in which, the inorganic compound B can be one or more selected from a group consisting of $Al_2O_3$, $AlF_3$, $AlPO_4$, $Li_3PO_4$, $Li_4P_2O_7$, $ZrO_2$, MgO, $TiO_2$, $Y_2O_3$, $LiAlO_2$ and $LiNiPO_4$; the carbon material can be one or more selected from a group consisting of carbon black (e.g. carbon black Super P), carbon fiber (VGCF), carbon nanotubes (CNTs), graphene, mesoporous ordered carbon (e.g. mesoporous ordered carbon CMK-3) and active carbon. The carbon material can also be formed from sintering of an organic material such as asphalt, sucrose. That is to say, in the coated materials formed after the above-mentioned materials being coated, the coating layer is one or more selected from a group consisting of $Al_2O_3$, $AlF_3$, $AlPO_4$, $Li_3PO_4$, $Li_4P_2O_7$, $ZrO_2$, MgO, $TiO_2$, $Y_2O_3$, $LiAlO_2$ and $LiNiPO_4$; or the coating layer is one or more selected from a group consisting of carbon black Super P, carbon fiber (VGCF), carbon nanotubes (CNTs), graphene, mesoporous ordered carbon (e.g. mesoporous ordered carbon CMK-3) and active carbon.

In a preferred embodiment, the content of the carbon material or the inorganic compound B is 0.005~5% of the total weight of the second positive electrode active material before being coated, further preferably, the content of the inorganic compound B is 0.05~4% of the total weight of the second positive electrode active material before being coated, furthermore preferably, the content of the inorganic compound B is 0.05~3% of the total weight of the second positive electrode active material before being coated, and most preferably is 0.05~2%.

Examples of the second positive electrode active material include: $LiCoO_2$, $LiNiO_2$, $LiNi_{0.5}Mn_{0.3}Co_{0.2}O_2$, $LiNi_{0.8}Al_{0.05}Co_{0.15}O_2$, a material formed from $LiNi_{0.8}Al_{0.05}Co_{0.15}O_2$ coated by $Al_2O_3$ with 0.1% content of the weight of $LiNi_{0.8}Al_{0.05}Co_{0.15}O_2$ before being coated and $TiO_2$ with 0.1% content of the weight of $LiNi_{0.8}Al_{0.05}Co_{0.15}O_2$ before being coated.

Preferably, in the above-mentioned positive electrode, the thickness of the second active material layer is 0.1~250 μm, further preferably, the thickness of the second active material layer is 0.5~200 μm, furthermore preferably, the thickness of the second active material layer is 50~100 μm.

Both the first active material layer and the second active material layer contain a positive electrode binder and a positive electrode conductive agent, the specific types of the positive electrode binder and positive electrode conductive agent are not particularly restricted, as long as the positive electrode binder selected plays the role of binding and the positive electrode conductive agent selected plays the role of conducting.

Preferably, the positive electrode binder is one or more selected from a group consisting of sodium carboxymethyl cellulose, polyacrylonitrile, polyacrylic acid, polystyrene butadiene copolymer, polyvinyl alcohol, polyurethane, polyene acid ester, polyvinylidene fluoride, epoxy resin and chlorinated rubber.

The content of the positive electrode binder can be selected according to actual demand. The content of the positive electrode binder is 0.5~20% of the total weight of the material layer to which it belongs; further preferably, the content of the positive electrode binder is 1~18% of the total weight of the material layer to which it belongs, furthermore preferably, the content of the positive electrode binder is 1~13% of the total weight of the material layer to which it belongs and most preferably is 1~5%. The material layer is the first active material layer or the second active material layer.

Preferably, the positive electrode conductive agent is one or more selected from a group consisting of conductive carbon black (e.g. carbon black Super P), superconductive carbon black, conductive graphite, carbon fiber (VGCF), acetylene black and carbon nanotubes (CNTs).

The content of the positive electrode conductive agent can be selected according to actual demand. Particularly, the content of the positive electrode conductive agent is 0.5~18% of the total weight of the material layer to which it belongs, further preferably, the content of the positive electrode conductive agent is 1~16% of the total weight of the material layer to which is belongs, furthermore preferably, the content of the positive electrode conductive agent is 2~15% of the total weight of the material layer to which it belongs and most preferably is 2.5~8%. The material layer is the first active material layer or the second active material layer.

In the buffer layer in the above-mentioned positive electrode, the specific type of the carbon material is not particularly restricted, which can be selected according to actual demand. For example, carbon black (e.g. carbon black Super P), carbon fiber (VGCF), carbon nanotubes (CNTs), graphene, mesoporous ordered carbon (e.g. mesoporous ordered carbon CMK-3), active carbon and so on can all be used as the carbon material in the buffer layer.

In the buffer layer of the above-mentioned positive electrode, the specific type of the binder is not particularly restricted, which can be selected according to actual demand. It is particularly noted that, besides the binding effect, the binder selected will also expand at a rising temperature, break the conductive network, increase the polarization of the battery, decrease the short-circuit current, so as to reduce the thermal runaway. For example, carboxylic sodium carboxymethyl cellulose, polyacrylonitrile, polyacrylic acid, polystyrene butadiene copolymer, polyvinyl alcohol, polyurethane, polyene acid ester, polyvinylidene fluoride, epoxy resin, vinyl acetate resin, chlorinated rubber and so on can all be used as the binder of the buffer layer. Preferably, the polyvinylidene fluoride is selected as the binder.

Preferably, in the buffer layer, the ratio of the total weight of the carbon material to the total weight of the binder is 1:9~9:1.

Preferably, in the above-mentioned positive electrode, the thickness of the buffer layer is 0.1~30 μm, further preferably, the thickness of the buffer layer is 0.5~30 μm.

Since the positive electrode provided by the present application includes the first active material layer arranged on the positive electrode current collector, the buffer layer and the second active material layer, in which the buffer layer is located between the first active material layer and the second active material layer, when applied in the lithium battery, especially in the Li-ion battery, the safety performance of the Li-ion battery is improved, for example, fire and explosion are not readily occurred in abuse conditions, furthermore, polarization increase and internal resistance increase in discharge are reduced, meanwhile increasing the electrolyte diffusion on the positive electrode interface, moreover, the existence of the buffer layer greatly reduces the interface damage of the battery due to the expansion difference of the active material layers in the cycle process of the battery, which greatly improves the cycle performance of the Li-ion battery, e.g. possessing relative high capacity retention after 3000 cycles.

In the above-mentioned positive electrode, the specific type of the positive electrode current collector can be selected according to actual demand, for example the aluminum foil or other types of aluminum can all be used as the positive electrode current collector. Preferably, the thickness of the positive electrode current collector is 5~30 μm, further preferably, the thickness of the positive electrode current collector is 10~20 μm.

The method of preparing the positive electrode provided by the present application is not particularly restricted, conventional methods can be selected. Preferably, the following method is selected to prepare the positive electrode provided by the present application, including:

(1) Adding the above-mentioned first positive electrode active material, positive electrode conductive agent and positive electrode binder into a solvent, and mixing evenly, then coating the evenly mixed slurry onto the positive electrode current collector to form the first active material layer.

In the above-mentioned step (1), the solvent is preferably N-methyl pyrrolidone; particularly, the viscosity of the mixed slurry is controlled at 100~20000 mPa·s; the coating method is not particularly restricted, for example extrusion coating method, gravure coating method, transfer coating method, spraying method, plasma spraying, chemical vapor deposition (CVD), physical vapor deposition (PVD) and so on can all be selected, as long as the prepared slurry is uniformly coated onto the positive electrode current collector. Particularly, the coating amount of the mixed slurry on the positive electrode current collector will make that the thickness of the first active material layer is 0.1~200 μm; the condition of the mixed slurry forming the first active material layer can be selected according to actual demand, for example drying at 50~120° C. is selected.

(2) Adding the carbon material and the binder into a solvent, for example into N-methyl pyrrolidone, mixing evenly, and then coating onto the first active material layer obtained from step (1) to form the buffer layer.

In the above-mentioned step (2), the coating amount of the mixed materials will make that the thickness of the buffer layer is 0.1~30 μm; the condition of the mixed materials forming the buffer layer can be selected according to actual demand, for example drying at 50~120° C. is selected; the coating method can also be selected according to actual demand, which is not specifically restricted.

(3) Adding the above-mentioned second positive electrode active material, positive electrode conductive agent and positive electrode binder into a solvent, and mixing evenly, then coating the evenly mixed slurry onto the buffer layer obtained from step (2) to form the second active material layer, and finally the positive electrode provided by the present application is obtained.

In the above step (3), the solvent is preferably N-methyl pyrrolidone; the coating method is not particularly restricted, for example extrusion coating method, gravure coating method, transfer coating method, spraying method, plasma spraying, chemical vapor deposition (CVD), physical vapor deposition (PVD) and so on can all be selected, as long as the mixed slurry prepared is uniformly coated onto the buffer layer. Particularly, the coating amount of the mixed slurry on the buffer layer will make that the thickness of the second active material layer is 0.1~250 μm; the condition of the mixed slurry forming the second active material layer can be selected according to actual demand, for example drying at 50~120° C. is selected.

In the above method of preparing the positive electrode, the preparing order of the first active material layer and the second active material layer can also be inverted, that is, the second active material layer is firstly prepared on the positive electrode current collector, then the buffer layer is formed on the second active material layer and at last the first active material layer is formed on the buffer layer.

Another objective of the present application is to provide a lithium battery, which includes the positive electrode provided by the present application.

As the Li-ion battery includes the positive electrode provided by the present application, the Li-ion battery possesses good safety performance, for example fire and explosion are not readily occurred in abuse conditions, besides, polarization increase and internal resistance increase in discharge are less occurred, and basically without interface damage due to the expansion difference of different active material layers, thus, the Li-ion battery also possesses excellent cycle performance, e.g. possessing relative high capacity retention after 3000 cycles.

EXAMPLES

The present application is further described by the following specific examples. However, these examples are merely exemplary, which do not constitute any restriction on the protection scope of the present application.

In the following examples, comparative examples and test examples, the materials, reagents and instruments used can all be conventional materials obtained from commercial approaches, or the reagents can be synthesized by conventional methods, unless otherwise noted.

In the following examples, comparative examples and test examples, used materials and raw materials are as follows:

First positive electrode active material: $LiFePO_4$ (LFP), $LiNi_{0.5}Mn_{1.5}O_4$ (LNMO), $LiMn_{0.75}Fe_{0.25}PO_4$ (LMFP), $Li_2CoSiO_4$ (LSCo), material (LNM') formed from coating $LiNi_{0.5}Mn_{1.5}O_4$ coated with $Al_2O_3$ of 0.1% content of the weight of $LiNi_{0.5}Mn_{1.5}O_4$ before being coated and $TiO_2$ of 0.1% content of the weight of $LiNi_{0.5}Mn_{1.5}O_4$ before being coated.

Second positive electrode active material: $LiCoO_2$ (LCO), $LiNiO_2$ (LNO), $LiNi_{0.5}Mn_{0.3}Co_{0.2}O_2$ (NCM523), $LiNi_{0.8}Al_{0.05}Co_{0.15}O_2$ (NCA), material (NCA') formed from coating $LiNi_{0.8}Al_{0.05}Co_{0.15}O_2$ with $Al_2O_3$ of 0.1% content of the weight of $LiNi_{0.8}Al_{0.05}Co_{0.15}O_2$ before being coated and $TiO_2$ of 0.1% content of the weight of $LiNi_{0.8}Al_{0.05}Co_{0.15}O_2$ before being coated.

Positive electrode conductive agent: carbon black Super P (SP).

Positive electrode binder: polyvinylidene fluoride (PVDF).

Carbon material: carbon black Super P (SP), carbon nanotubes (CNTs), graphene (GP), mesoporous ordered carbon (CMK-3).

Binder: polyvinylidene fluoride (PVDF).

Solvent: N-methyl pyrrolidone (NMP).

Positive electrode current collector: aluminum foil with a thickness of 12 μm.

Electrolyte: containing 1M lithium hexafluorophosphate (LiPF6), in which, the non-aqueous organic solvent is a mixture of ethylene carbonate, propylene carbonate and diethyl carbonate, and the volume ratio is ethylene carbonate:propylene carbonate:diethyl carbonate=3:3:4.

Separator: polyethylene separator with a thickness of 14 μm.

Preparation of Li-Ion Batteries of Examples 1~7

Li-ion batteries 1~7 are all prepared by the following method:

1. Preparation of the Positive Electrode

Positive electrodes 1~7 are all prepared by the following method:

(1) Adding the first positive electrode active material or the second positive electrode active material, the positive electrode conductive agent and the positive electrode binder into the solvent, and mixing evenly, then coating the evenly mixed slurry by a spraying instrument onto the positive electrode current collector to form the first active material layer, and then drying at 85° C. after coating.

(2) Adding the carbon material and the binder into the solvent, mixing evenly, and then coating onto the first active material layer obtained from step (1) to form the buffer layer, drying at 75° C. after coating.

(3) Adding the second positive electrode active material or the first positive electrode active material, the positive electrode conductive agent and the positive electrode binder into the solvent, and mixing evenly, then coating the evenly mixed slurry onto the buffer layer obtained from step (2), and drying at 85° C. after coating, and then calendering, cutting edge, trimming, slitting, drying for 4 hours at 85° C. under vacuum condition, and welding electrode tab, so as to form the positive electrode.

2. Preparation of the Negative Electrode

Mixing the graphite, SP, sodium carboxymethyl cellulose (CMC) thickening agent and styrene butadiene rubber binder according to the weight ratio of graphite: SP: styrene butadiene rubber binder: sodium carboxymethyl cellulose (CMC) thickening agent=96.5:1:1:1.5, adding into deionized water and mixing under the stirring action of a vacuum mixer to obtain the negative electrode slurry; uniformly coating the negative electrode slurry onto a copper foil and drying at 85° C. after coating; and then calendering, cutting edge, trimming, slitting, again drying for 4 hours at 110° C. under vacuum condition, and welding electrode tab, so as to obtain the negative electrode.

3. Preparation of the Li-Ion Batteries

Overlapping the positive electrode, separator and negative electrode in sequence, with the separator located between the positive electrode and the negative electrode, and then winding to obtain the bare cell; then putting the bare cell into an outer packing foil, injecting the prepared electrolyte into the battery after being dried, and the Li-ion battery is obtained after the processes of vacuum packaging, standby, formation, shaping and so on.

In the above preparing process of the battery, the specific types and content of the used electrode, the positive electrode active material, the second positive electrode active material, the positive electrode binder, the positive electrode conductive agent, the carbon material and the binder used in each electrode, and the thickness of each material layer obtained after testing are shown in the following Table 1, Table 2 and Table 3 respectively.

In Table 1, Table 2 and Table 3, the content of the positive electrode binder is a weight percentage calculated based on the total weight of the material layer to which the positive electrode binder belongs, the content of the positive electrode conductive agent is a weight percentage calculated based on the total weight of the material layer to which the positive electrode conductive agent belongs, and in the buffer layer, the ratio data represents the ratio of the carbon material weight to the binder weight.

TABLE 1

| | | First active material layer | | | | | |
|---|---|---|---|---|---|---|---|
| Battery No. | Electrode No. | Positive electrode active material Type | Positive electrode conductive agent Type | Content | Positive electrode binder Type | Content | Thickness μm |
| Battery 1 | Electrode 1 | LFP | SP | 8% | PVDF | 17% | 5 |
| Battery 2 | Electrode 2 | LNMO | SP | 15% | PVDF | 5% | 10 |
| Battery 3 | Electrode 3 | LSCo + LMFP | SP | 15% | PVDF | 5% | 15 |
| Battery 4 | Electrode 4 | LSCo | SP | 15% | PVDF | 8% | 20 |
| Battery 5 | Electrode 5 | LMFP | SP | 14% | PVDF | 7% | 50 |
| Battery 6 | Electrode 6 | LNM' | SP | 8% | PVDF | 15% | 10 |
| Battery 7 | Electrode 7 | NCM523 | SP | 2% | PVDF | 1% | 100 |

Noted:
LSCo weight:LMFP weight = 3:1.

TABLE 2

| | | Buffer layer | | | |
|---|---|---|---|---|---|
| Battery No. | Electrode No. | Carbon material Type | Binder Type | Ratio | Thickness μm |
| Battery 1 | Electrode 1 | SP + CNTs + CMK-3 SP weight:CNTs weight:CMK-3 weight = 5:1:1 | PVDF | 7:3 | 3 |
| Battery 2 | Electrode 2 | SP + CNTs + GP SP weight:CNTs weight:GP weight = 4:2:1 | PVDF | 7:3 | 20 |
| Battery 3 | Electrode 3 | SP + CMK-3 SP weight:CMK-3 weight = 1:1 | PVDF | 1:1 | 5 |
| Battery 4 | Electrode 4 | SP + CNTs + CMK-3 SP weight:CNTs weight:CMK-3 weight = 5:1:1 | PVDF | 7:3 | 3 |
| Battery 5 | Electrode 5 | SP + CNTs + GP SP weight:CNTs weight:GP weight = 4:2:1 | PVDF | 7:3 | 2 |
| Battery 6 | Electrode 6 | SP + CMK-3 SP weight:CMK-3 weight = 1:1 | PVDF | 1:1 | 0.5 |
| Battery 7 | Electrode 7 | SP + CNTs + CMK-3 SP weight:CNTs weight:CMK-3 weight = 5:1:1 | PVDF | 7:3 | 30 |

TABLE 3

| Battery No. | Electrode No. | Second active material layer | | | | | Thickness μm |
|---|---|---|---|---|---|---|---|
| | | Positive electrode active material Type | Positive electrode conductive agent Type | Content | Positive electrode binder Type | Content | |
| Battery 1 | Electrode 1 | NCM523 | SP | 2% | PVDF | 1% | 100 |
| Battery 2 | Electrode 2 | LCO | SP | 2% | PVDF | 1% | 90 |
| Battery 3 | Electrode 3 | NCM523 + LNO | SP | 2% | PVDF | 1% | 80 |
| Battery 4 | Electrode 4 | LNO | SP | 3% | PVDF | 5% | 70 |
| Battery 5 | Electrode 5 | NCA | SP | 5% | PVDF | 4% | 60 |
| Battery 6 | Electrode 6 | NCA' | SP | 8% | PVDF | 6% | 50 |
| Battery 7 | Electrode 7 | LFP | SP | 8% | PVDF | 17% | 5 |

Noted:
NCM523 weight:LNO weight = 77:20.

COMPARATIVE EXAMPLES

Comparative Example 1: Preparation of Battery $1^\#$

Battery $1^\#$ is obtained by repeating the preparation of the battery 1 of Example 1, in which, the first active material layer and the buffer layer are not coated, the positive electrode active material of the second active material layer in Electrode 1 is NCM523, and the other conditions are not changed.

Comparative Example 2: Preparation of Battery $2^\#$

Battery $2^\#$ is obtained by repeating the preparation of the battery 1 of Example 1, in which, the first active material is not coated, and the other conditions are not changed.

Comparative Example 3: Preparation of Battery $3^\#$

Battery $3^\#$ is obtained by repeating the preparation of the battery 1 of Example 1, in which, the buffer layer is not coated, and the other conditions are not changed.

TEST EXAMPLES (1) Safety Test

The safety performance of the batteries is characterized by the nailing test.

The following tests are carried out respectively for the prepared batteries:

Fully charging the battery to 4.2V with 1 C current, nailing through the battery with a high temperature resistant steel needle of 5 mm diameter (the conic angle of the needle tip is 45° at the speed of 25 mm/s, from the direction vertical to the electrode of the battery, the nailing position is suitably located near the geometric center of the punctured surface, and the needle tip stops in the battery. The nailing path temperature is tested, the condition of the battery is observed, and the results are as shown in the following Table 4.

(2) Discharging Internal Resistance Test

The following tests are carried out respectively for the prepared batteries:

At 25° C., adjusting the battery to 50% SOC with 1 C current, then discharging for 30 s with 4 C current, and obtaining the discharging internal resistance by calculation with the following formula; the test results are as shown in Table 4, SOC represents the state of charge.

Discharging internal resistance=$\Delta U/\Delta I$, in which, $\Delta U$ represents the change value of voltage before and after the discharge; $\Delta I$ represents the change value of current before and after the discharge.

(2) Cycle Test

The following tests are carried out respectively for the prepared batteries:

At 25° C., cycling the battery under 1 C/1 C, the cycling conditions are as follows:

Adjusting the battery to 25° C., 1) standby for 5 min,
2) charging to 4.2V with 1 C constant current, and then to 0.05 C with 4.2V constant voltage,
3) standby for 5 min,
4) discharging to 2.8V with 1 C constant current,
5) standby for 5 min,
6) cycling from step 1) to step 5) until the capacity decreases to less than 80%, the voltage range of the charging and discharging is 2.8~4.2V, the cycling is stopped when the capacity decreases to 80% of specific capacity of the first discharge, and counting the total cycling times. Related counting results are as shown in Table 4.

TABLE 4

| Battery No. | Safety test | Discharging internal resistance | Cycle test |
|---|---|---|---|
| Battery 1 | No sparking, no fire, nailing path temperature 80° C. | 0.78 mΩ | 4000 times |
| Battery 2 | No sparking, no fire, nailing path temperature 72° C. | 0.92 mΩ | 3200 times |
| Battery 3 | No sparking, no fire, nailing path temperature 76° C. | 0.78 mΩ | 3100 times |
| Battery 4 | No sparking, no fire, nailing path temperature 89° C. | 0.82 mΩ | 3300 times |
| Battery 5 | No sparking, no fire, nailing path temperature 92° C. | 0.85 mΩ | 3420 times |
| Battery 6 | No sparking, no fire, nailing path temperature 101° C. | 0.79 mΩ | 3280 times |
| Battery 7 | No sparking, no fire, nailing path temperature 100° C. | 0.82 mΩ | 3100 times |
| Battery $1^\#$ | Burning, nailing path temperature 800° C. | 1.0 mΩ | 2700 times |

TABLE 4-continued

| Battery No. | Safety test | Discharging internal resistance | Cycle test |
|---|---|---|---|
| Battery 2# | Burning, nailing path temperature 720° C. | 0.94 mΩ | 2800 times |
| Battery 3# | Sparking, no fire, nailing path temperature 300° C. | 1.6 mΩ | 1131 times |

It can be learned from the relevant data in the above Table 4 that, compared with Batteries 1#~3#, Batteries 1~7 all possess lower nailing path temperature, no sparking, no fire, smaller discharging internal resistance and more cycle times after the nailing test, discharging internal resistance test and cycle test.

The existence of the buffer layer improves the conductivity of the first active material layer and the second active material layer, which helps to improve the interface and reduce the interface damage caused by the expansion difference of the active material layers in the cycling process. Comparative example 2 without the first active material layer does not pass the nailing safety test and the battery catches fire. As the battery of Comparative example 3 does not have the buffer layer and the expansion of the first active material layer and the second active material layer expansion is different, the interface deteriorates, sparks occur when nailing, the discharging internal resistance increases and the cycle performance are quite poor, merely 1131 cycles. As Comparative example 1 does not contain the first active material layer and the buffer layer, the battery does not pass the nailing safety test and catches fire, though there is no interface problem due to different active materials.

Comparing Example 1 and Example 7, in Example 1, the active material containing LFP, as the first active material layer, is the bottom layer coated on positive electrode current collector, and the active material containing NCM523, as the second active material layer, is coated on the top of the buffer layer; however, the coating order of Example 7 is completely opposite to that of Example 1, it can be concluded from Table 4 that Example 1 has much smaller discharge internal resistance and much better cycle performance.

The use of LFP alone increases the polarization of the battery and decreases the cycle performance significantly. Adding the buffer layer between the first active material layer and the second active material layer can significantly improve the safety and electrochemical performance of the battery, for example, improve the cycle performance of the battery.

Therefore, it can be learned that the positive electrode provided by the present application, when applied to the Li-ion battery, can improve the safety and cycle performance of the Li-ion battery.

According to the disclosure of the above-mentioned instructions, the person skilled in the art of the present application can also make appropriate variations and modifications to the above-mentioned embodiments. Therefore, the present application is not limited to the specific embodiments disclosed and described above, the variations and modifications to the present application shall also fall into the scope of the protection scope of the claims of the present application.

What is claimed is:

1. A positive electrode, comprising a positive electrode current collector, a first active material layer comprising a first positive electrode active material arranged on the positive electrode current collector, a buffer layer consisting of a carbon material and a binder, and a second active material layer comprising a second positive electrode active material, wherein the buffer layer is arranged between the first active material layer and the second active material layer; each of the first active material layer and the second active material layer further comprises a positive electrode binder and a positive electrode conductive agent; the carbon material of the buffer layer consists of mesoporous ordered carbon and at least one of carbon black, carbon nanotubes or, graphene, the binder is (PVDF), and a ratio of a total weight of the carbon material to a total weight of the binder is 7:3~1:1.

2. The positive electrode according to claim 1, wherein, the first positive electrode active material is one or more selected from a group consisting of lithium phosphate salt, lithium silicate salt, lithium spinel salt, a positive electrode material formed after the lithium phosphate salt, lithium silicate salt or lithium spinel salt being doped or coated, and a positive electrode material formed after the lithium phosphate salt, lithium silicate salt or lithium spinel salt being doped and coated.

3. The positive electrode according to claim 2, wherein, the first positive electrode active material is one or more selected from a group consisting of $LiM'_xM_{1-x}PO_4$, $Li_2M'_xQ_{1-x}SiO_4$, $LiM'_{x''}M_{2-x''}O_4$ and a material formed after $LiM'_xM_{1-x}PO_4$, $Li_2M'_xQ_{1-x}SiO_4$ or $LiM'_{x''}M_{2-x''}O_4$ being coated by a material selected from a group consisting of a carbon material and inorganic compound A; wherein M is at least one selected from a group consisting of Mn, Fe, Co and Ni; Q is at least one selected from a group consisting of Mn, Fe, Co and Ni; M' is one or more selected from a group consisting of Al, Cr, Mg, Zr, Mo, V, Ti, B, F and Y; the inorganic compound A is one or more selected from a group consisting of $Al_2O_3$, $AlF_3$, $AlPO_4$, $Li_3PO_4$, $Li_4P_2O_7$, $ZrO_2$, MgO, $TiO_2$, $Y_2O_3$, $LiAlO_2$ and $LiNiPO_4$; wherein $0 \le x \le 0.25$, $0 \le x' \le 0.25$, $0 \le x'' \le 0.25$.

4. The positive electrode according to claim 1, wherein, the second positive electrode active material is one or more selected from a group consisting of lithium cobalt dioxide, lithium nickelate, a ternary lithium compound containing Ni, Co and Mn, a ternary lithium compound containing Ni, Co and Al, a positive electrode material formed after the lithium cobalt dioxide, the lithium nickelate, the ternary lithium compound containing Ni, Co and Mn, or the ternary lithium compound containing Ni, Co and Al being doped or coated, and a positive electrode material formed after the lithium cobalt dioxide, the lithium nickelate, the ternary lithium compound containing Ni, Co and Mn, or the ternary lithium compound containing Ni, Co and Al being doped and coated.

5. The positive electrode according to claim 4, wherein, the second positive electrode active material is one or more selected from a group consisting of $Li_aQ'_zCo_{1-z}O_2$, $Li_aQ'_zNi_{1-z}O_2$, $Li_aQ'_zNi_yMn_yCo_{1-y-y'-z'}O_2$, $Li_aQ''_{z'''}Ni_{y'''}Al_{1-y'''}Co_{1-y''-y'''-z'''}O_2$, and a material formed after the $Li_aQ'_zCo_{1-z}O_2$, $Li_aQ'_zNi_{1-z}O_2$, $Li_aQ'_zNi_yMn_yCo_{1-y-y'-z'}O_2$ or $Li_aQ''_{z'''}Ni_{y'''}Al_{y'''}Co_{1-y''-y'''-z'''}O_2$ being coated by a carbon material or inorganic compound B; wherein, Q' is one or more selected from a group consisting of Al, Cr, Mg, Zr, Mo, V, Ti, B, F and Y; Q" is one or more selected from a group consisting of Cr, Mg, Zr, Mo, V, Ti, B, F and Y; inorganic compound B is one or more selected from a group consisting of $Al_2O_3$, $AlF_3$, $AlPO_4$, $Li_3PO_4$, $Li_4P_2O_7$, $ZrO_2$, MgO, $TiO_2$, $Y_2O_3$, $LiAlO_2$ and $LiNiPO_4$; wherein, $0 \leq z \leq 0.25$, $0 \leq z' \leq 0.25$, $0 \leq z'' \leq 0.25$, $0 \leq z''' \leq 0.25$, $0 < y < 1$, $0 < y' < 1$, $0 < y'' < 1$, $0 < y''' < 1$, $0 < y+y'+z'' < 1$, $0 < y''+y'''+z''' < 1$, $1 \leq a \leq 1.2$.

6. The positive electrode according to claim 1, wherein the binder of the buffer layer further comprises one or more selected from a group consisting of carboxylic sodium carboxymethyl cellulose, polyacrylonitrile, polyacrylic acid, polystyrene butadiene copolymer, polyvinyl alcohol, polyurethane, polyene acid ester, epoxy resin and chlorinated rubber.

7. The positive electrode according to claim 1, wherein, a thickness of the first active material layer is 0.1~200 μm; a thickness of the second active material layer is 0.1~250 μm; and a thickness of the buffer layer is 0.130 μm.

8. The positive electrode according to claim 1, wherein, a thickness of the first active material layer is 5~50 μm; a thickness of the buffer layer is 0.5~30 μm; and a thickness of the second active material layer is 50~100 μm.

9. A Li-ion battery, comprising the positive electrode according to claim 1.

* * * * *